Dec. 31, 1968 C. M. MELAS 3,419,805

BINARY TO MULTILEVEL CONVERSION BY COMBINING REDUNDANT INFORMATION SIGNAL WITH TRANSITION ENCODED INFORMATION SIGNAL

Filed Oct. 8, 1965

Sheet 1 of 2

INVENTOR
Constantine Michael Melas

BY Homer L. Knearl
AGENT

United States Patent Office 3,419,805
Patented Dec. 31, 1968

3,419,805

BINARY TO MULTILEVEL CONVERSION BY COMBINING REDUNDANT INFORMATION SIGNAL WITH TRANSITION ENCODED INFORMATION SIGNAL

Constantine Michael Melas, Antibes, France, assignor to International Business Machines Corporation, Armonk, N.Y., a corporation of New York Filed Oct. 8, 1965, Ser. No. 494,224
Claims priority, application France, Oct. 16, 1964, 7,485
3 Claims. (Cl. 325—38)

ABSTRACT OF THE DISCLOSURE

This invention relates to a data transmission encoding system whereby a serial binary data bit input is divided into two segments, each segment having two parts. The first part of each data segment is transition encoded such that a change in the signal level from that of the previous bit time period represents one possible binary bit value during a given time period and the same value as in the previous time period represents the other possible binary bit value. The second part of the data segment may be encoded the same as the first part or may be encoded as its binary bit value followed by its inverse binary bit value. The two encoded parts of each segment are then combined to form a single encoded output having a new representation for the input binary data.

This invention relates to a data transmission encoding system. More particularly the invention relates to an improved data encoder of the type taught in copending application, Ser. No. 455,112 filed May 12, 1965.

Melas and Gorog in the copending application, Ser. No. 455,112, entitled Data Transmission Devices, discovered that the frequency spectrum of a data waveform could be reduced and therefore more easily matched to a transmission line by encoding it into a redundant information signal consisting of successive pulses followed by successive inverse pulses. Each pulse has its inverted identical twin pulse following it .5 T second later. T is the period of a frequency $1/T$ equal to ½ the bandwidth of the bandpass characteristic of the transmission line over which the information is to be sent. By sending pulses followed by corresponding inverse pulses .5 T second later, the spectrum of the redundant information signal will be maxum near and symmetrical about the frequency $1/T$ and zero near the frequencies zero and $2(1/T)$. This signal may then be shifted up to correspond with the bandpass characteristic of the transmission line.

The redundant information signal, as generated in the copending application, is advantageous because, first, it is matched to the bandpass characteristic of the transmission line, and second, it enables the receiver to recover a clock signal from the redundant information signal.

It is desirable to improve the operation of the data transmission device by reducing its susceptibility to distortion and by increasing its efficiency when used for clock recovery. Data distortion may occur due to phase reversal of the unmodulated carrier in the transmitting or receiving apparatus. When there is such a phase reversal, data, which is conveyed by phase, will be distorted in the sense that it is inverted or complemented without the receiver realizing it. With regard to clock recovery, the clock recovery circuit requires transitions in the data in order to reset its clock circuit. Thus, if a data pattern having no transitions arrives for an unusual length of time, the recovered clock signal will be lost.

It is an object of this invention to improve the data transmission device as taught in copending application 455,112 by making the device less susceptible to information distortion by phase reversal.

It is a further object of this invention to improve the data transmission device of the copending application 455,112 by increasing the probability of transitions in the transmitted signal no matter what the pattern of data to be transmitted.

In accordance with this invention the above objects are accomplished by splitting the data to be transmitted into two channels, one for controlling the amplitude of the transmitted signal and the other for controlling the phase of the transmitted signal and by also transition encoding data in the phase channel. More particularly, the data to be transmitted is fed into a shift register in a pattern of four bits. The first two bits are separated from the third and fourth bits with the third and fourth bits going to the amplitude channel and the first two bits going to the phase channel. In the phase channel the first two bits are double transition encoded and then encoded in a redundant information signal of the type taught in the copending application, Ser. No. 455,112. In the amplitude channel the third and fourth bits are just repeated .5 T second after each other to form also a redundant information signal. In the amplitude channel the repeated bits are not inverted with respect to the original bits. These channels are then combined into a four level waveform with the phase channel controlling the phase of the waveform and the amplitude channel controlling the amplitude of the waveform.

The main advantages of my invention are first that by transition encoding the phase channel the data is conveyed by transitions in the waveform, and thus a phase reversal of the received signal at the receiver does not destroy detection of the data. Another advantage is that, by transition encoding, the probability of getting transitions in the transmitted signal is increased so that the clock recovery circuit is more apt to be triggered often enough to keep its clock circuit oscillating.

The foregoing and other objects, features and advantages of the invention will be apparent from the following more particular description of a preferred embodiment of the invention as illustrated in the accompanying drawings.

Figure 1:
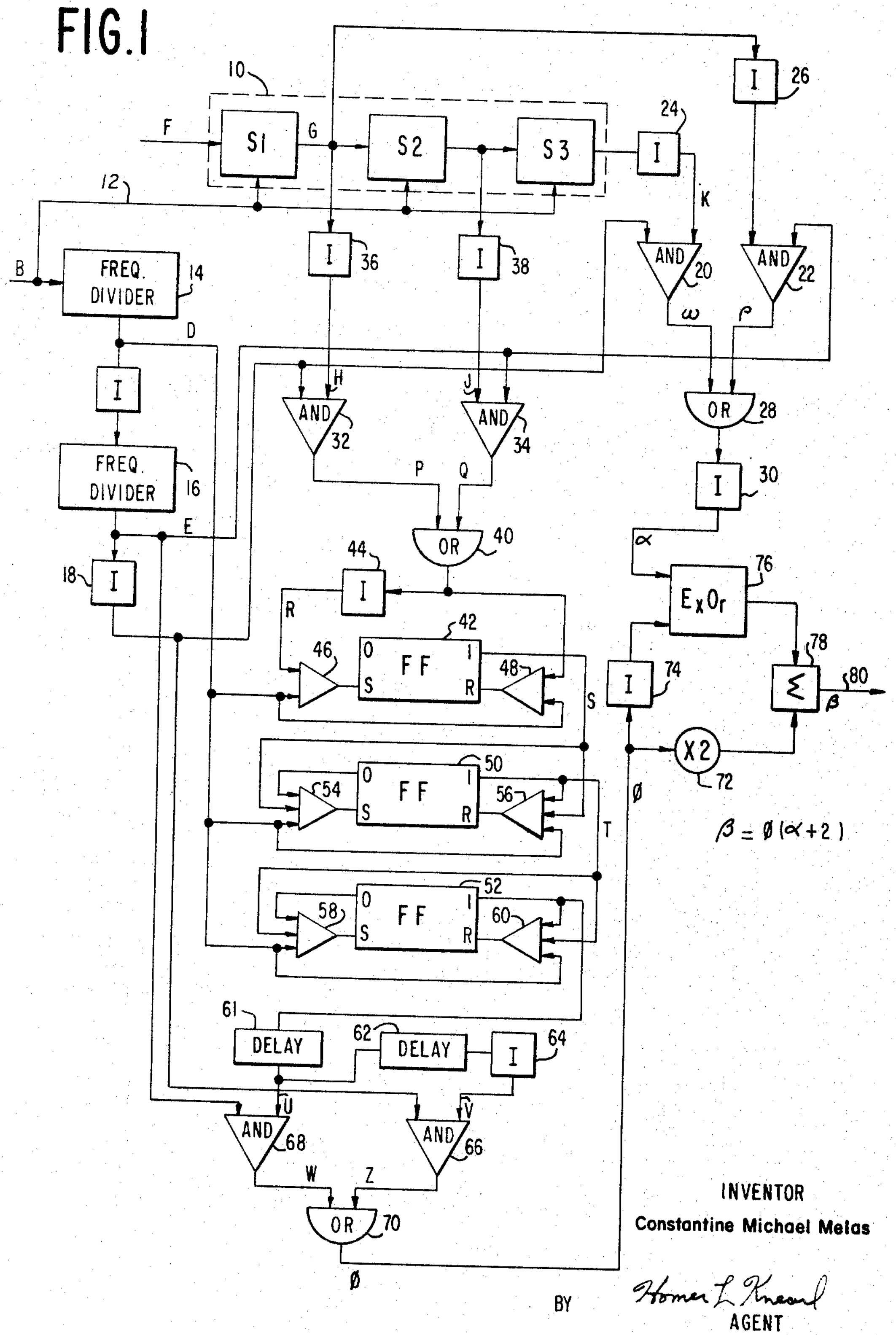
FIG. 1 shows the preferred embodiment of the invention.

Referring now to FIG. 1, a preferred embodiment of the invention is constructed as follows. Data arrives over line F and passes into a three stage shift register where the stages are denoted as S1, S2 and S3. A clock signal arrives on line 12 and is passed to each stage of the shift register. The frequency of clock signal is divided by two by frequency divider 14. The resulting lower frequency is again divided by two by frequency divider 16. All of the timing used for gating the logic in the preferred embodiment is provided by these frequency dividers and inverter 18.

To separate half the data into a first channel, AND gates 20 and 22 are gated by timing signals to pass from the shift register the third and fourth data bits in each pattern of four received data bits. These AND gates receive data from the shift register through inverters 24 and 26. OR gate 28 collects the output from AND gates 20 and 22, and inverter 30 inverts this output. This logic in combination with the shift register selects the third and fourth data bits and repeats them once to form a redundant pattern of regular data bits.

To separate out for a second channel the first and second data bits from the pattern of four received data bits AND gates 32 and 34 are also triggered by the timing signals. These AND gates receive data from the shift register through inverters 36 and 38. The output of the AND gates 32 and 34 is collected by OR gate 40 and passed to flip-flop 42. Flip-flop 42 when gated by the timing signals effectively selects the first two data bits in each serial pattern of four bits received by the shift register and doubles their width of duration. The gating of flip-flop 42 is through inverter 44 and AND gates 46 and 48.

Figure 2:
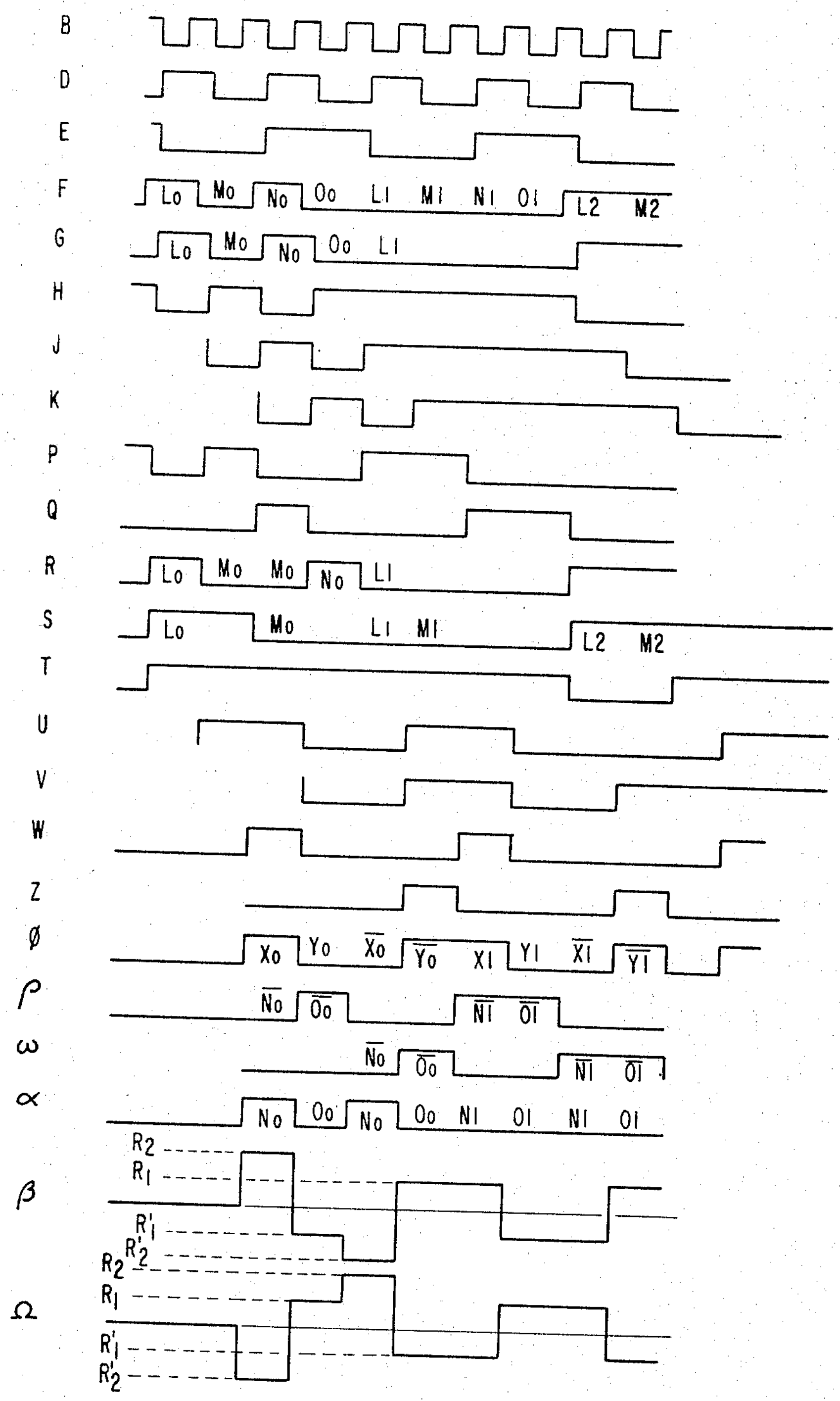
FIG. 2 shows waveforms occurring at different points in the embodiment in FIG. 1.

Transition encoding is a binary encoded format, sometimes referred to as NRZI or Non-Return-to-Zero, Inverted, in which the binary bit value is transmitted through the change in level or lack of change in level of a signal. In the preferred embodiment of this invention, the data signal T, shown in FIGURE 2, is the transition encoded form for the data signal S. A binary 1 or $L_0$ is represented by a change in the state of line T. When a zero follows, such as $M_0$, $L_1$ and $M_1$, the transition encoded signal T does not change. Therefore, the transmission of a 1 in a transition encoded format appears as a change in the output level from the previous level and the transmission of a 0 is the transmission of the same level as that of the previous bit transmitted. It will be further recognized by those skilled in the art that the representation of these binary bits may be reversed. That is, a 0 is represented by a change in the output level while a 1 is represented by no change in the output level.

To transition encode the data bits selected by flip-flop 42, flip-flops 50 and 52 are placed in series with the output from flip-flop 42. Each flip-flop 50 and 52 when gated by the timing signals through AND gates 54, 56 and 58, 60, respectively, transition encode the data signal applied to the AND gates of the flip-flop. Therefore, the output of flip-flop 52 is the double transition encoded form of the data from the output of flip-flop 42.

To generate a redundant information signal as taught in the copending application, Ser. No. 455,112, the transition encoded signal is delayed by delay 62 and inverted by inverter 64 and passed to AND gate 66. In addition, AND gate 68 receives the transition encoded signal directly. When AND gates 68 and 66 are triggered by the timing signals, OR gate 70 collects their outputs to form from the transition encoded signals a signal consisting of successive pulses followed by successive inverse pulses, where each pulse has its inverted pulse following it .5T second later. Thus a redundant information signal consisting of a complementary pattern of transition encoded data bits presented at the output $\phi$ of OR gate 70.

The two channels of data which have been separated and processed separately are now recombined in the combining circuitry consisting of multiplier 72, inverter 74, Exclusive OR gate 76, and summer 78. This combining circuitry acts to form a four level signal on line $\beta$ wherein the phase of the signal is controlled by the channel having the complementary pattern of transition encoded data bits, and the amplitude of the four level signal is controlled by the channel having the redundant pattern of regular data bits.

The invention is best understood by examining the operation of the preferred embodiment in FIG. 1. Reference should also be made to FIG. 2 which contains the waveforms which appear at different points in the system of FIG. 1 as indicated by the capital letters.

Initially data is received on line F by shift register 10. The data is a two level signal as shown in waveform F in FIG. 2. The shifting of data through shift register 10 is controlled by the clock signal B.

The clock signal B is also used to generate timing signals D and E. Timing signal D is derived by dividing the clock signal B by two. Clock signal E is derived by inverting the timing signal D and dividing that signal by two also. Timing signal E is used along with its inverted form to control the AND gates 20, 22, 32 and 34.

The function of AND gates 20 and 22 is to select out the last two data bits in a pattern of four data bits being serially received on line F. Thus, for example, in the pattern of four data bits L*o*, M*o*, N*o*, O*o*, these AND gates select out the data bits N*o* and O*o*. This is accomplished by gating AND gate 22 with timing signal E and by gating AND gate 20 with the inverted time signal E. The other input to AND gate 22 is the data signal at the output of the first stage S1 of the shift register 10 denoted as waveform G in FIG. 2. Waveform G is inverted by inverter 26 prior to its application to AND gate 22. AND gate 20 receives data from the last stage S3 of the shift register. The data from S3 is identical to that from stage S1 denoted as waveform G except that it is delayed by two data bits or .5T second. Before being passed to AND gate 20, the data from stage S3 is inverted by inverter 24. Thus in FIG. 2, waveform K is inverted and delayed by two bits from waveform G. Inverted waveform E then gates through AND gate 20, the inverted N*o* and O*o* pulse and thus generates waveform $\omega$. Meanwhile AND gate 22 being controlled by waveform E gates the inverted N*o*, O*o* to form waveform $\rho$ shown in FIG. 2. Waveforms $\omega$ and $\rho$ are then collected by OR gate 28 and inverted to form waveform $\alpha$. As shown in FIG. 2, waveform $\alpha$ is made up of a redundant pattern of the last two data bits in each received four data bit block (waveform F).

The other channel selects half of the data via logic gates 32, 34 and 40. AND gate 32 is gated by inverted E waveform while AND gate 34 is gated by the E waveform itself. Applied to the AND gates 32 and 34 are the data signals H and J where J is delayed one data bit relative to H. AND gate 32 then forms waveform P while AND gate 34 forms waveform Q. OR gate 40 collects waveforms P and Q and passes the combined waveform to flip-flop 42. This waveform is inverted by inverter 44 and shown as waveform R in FIG. 2.

Waveform R in combination with the D waveform timing signal is used to trigger the set terminal of flip-flop 42 via AND gate 46. Simultaneously, an inverted waveform R is used to trigger the reset terminal of flip-flop 42 through AND gate 48. The resultant output S from flip-flop 42 is the first two data bits of the originally received four bit patterns with the duration of each data bit doubled in length.

To transition encode these first two data bits, waveform S is passed on to AND gates 54 and 56 of flip-flop 50. In addition to waveform S flip-flop 50 is gated by timing signal D and a feedback signal from its own output terminals. The output waveform T from flip-flop 50 changes from one level to its other level each time waveform S is a one or at an up level. Flip-flop 52 and AND gates 58 and 60 operate exactly as flip-flop 50. Thus, waveform U from flip-flop 52 will change from one of its levels to the other level each time waveform T is a one or at an up level. Thus waveform U is the double transition encoded form of the data in waveform S.

Waveform U is then encoded into a redundant information signal as taught in copending application Ser. No. 455,112. This is accomplished first by delaying and inverting waveform U in delay line 62 and inverter 64 to form waveform V. Then, waveform U is then gated through AND gate 68 by waveform E, while waveform V is gated by the inverted E waveform through AND gate 66. The resultant waveform W from AND gate 58 represents the first two bits in waveform U, while waveform Z represents the same two bits inverted and delayed by .5T second. OR gate 70 collects the result and uses it to make up waveform $\phi$. Waveform $\phi$ is thus encoded in a redundant complementary pattern of transition encoded data bits wherein each bit is followed .5T second later by its inverted identical twin.

The first and second channels are now combined for transmission in a manner such that the waveform $\phi$ will control the phase while the waveform $\alpha$ will control the amplitude. To encode the two channels one into amplitude and the other into phase, the logic circuitry 72, 74, 76 and 78 is provided. This logic circuitry performs the following equation: $\beta=\phi(\alpha+2)$. Inverter 74 in combination with Exclusive OR 76 acts to multiply the $\phi$ channel times the $\alpha$ channel. The two times multiplier acts to multiply the $\phi$ channel by two. Summer 78 then collects the result of these two operations to form waveform $\beta$ shown in FIG. 2.

To demodulate the waveform $\beta$ at a receiver the above operation need only be reversed. Notice that since the data in the $\phi$ channel is transition encoded, even if there is a phase reversal (waveform $\Omega$), the receiver will still decode the same data.

It will be appreciated by one skilled in the art that the two channels $\phi$ and $\alpha$ could be combined in many ways other than the specific equation set out above. It will also be appreciated by one skilled in the art that the transition encoding could be applied equally to both channels instead of being applied to one channel as shown in the preferred embodiment. For example, the transition encoded channel could be duplicated and connected similarly to shift register 10 to operate on the last two data bits in each block of four bits.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Data transmission apparatus comprising:
- a source of data;
- distributing means responsive to said source for distributing a first half of the data to a first channel and a second half of the data to a second channel;
- first gating means in the first channel for forming from data bits from said distributing means a redundant pattern of data bits with each bit followed by its identical twin .5T second later;
- transition encoding means for transition encoding the data in the second channel into a bi-level waveform wherein the transitions between the two levels contain the data;
- delay means responsive to said transition encoding means for delaying the inverted bi-level waveform .5T second;

- inverting means responsive to said delaying means for inverting the delayed bi-level waveform;
- second gating means responsive to said transition encoding means and said inverting means for gating out a complementary pattern of transition encoding data bits with each bit followed by its inverted identical twin .5T second later; and
- combining means responsive to said first gating means and said second gating means for combining the redundant pattern of transition encoded data bits to form a multi-level waveform wherein in each time period T of the waveform the second half of the period is the complement of the first half of the period.

2. The apparatus of claim 1 wherein said transition encoding means comprises:
- a first transistion encoder for transition encoding the data in the second channel into a first bi-level waveform having a transition between the two levels for each data bit in a given binary state; and
- a second transition encoder for transition encoding the first bi-level waveform into asecond bi-level waveform having a transition between the two levels for each bit of the first bi-level waveform at a given binary level so that said transition encoding means double transition encodes the data bits in the second channel.

3. The apparatus of claim 1 wherein said combining means forms a four-level waveform with the amplitude of the four-level waveform controlled by the redundant pattern of data bits and the phase of the four-level waveform controlled by the complementary pattern of transition encoded data bits.

References Cited

UNITED STATES PATENTS 3,204,029 8/1965 Groff ---------------- 178—68

ROBERT L. GRIFFIN, *Primary Examiner.*

WILLIAM S. FROMMER, *Assistant Examiner.*

U.S. Cl. X.R.

178—68